June 20, 1961 W. SEIGLE 2,988,840
FISHING FLOAT

Filed March 4, 1960 2 Sheets-Sheet 1

WILLIAM SEIGLE
*INVENTOR.*

BY Royal J. Miller

ATTORNEY

June 20, 1961 W. SEIGLE 2,988,840
FISHING FLOAT
Filed March 4, 1960 2 Sheets-Sheet 2

WILLIAM SEIGLE
INVENTOR.

ATTORNEY

United States Patent Office 2,988,840
Patented June 20, 1961

2,988,840
FISHING FLOAT
William Seigle, 1619 Elm, Dallas, Tex.
Filed Mar. 4, 1960, Ser. No. 12,768
7 Claims. (Cl. 43—17)

The present invention relates to fishing floats or lures and more particularly to an illuminating fishing float for use while fishing at night.

The instant invention is a continuation-in-part of an application filed by me in the United States Patent Office on May 20, 1959, under Serial Number 814,609 now Patent Number 2,933,844, for fishing float. This invention is, also, an improvement over the United States Patents numbered 2,544,968, 2,869,274, and 2,924,905, which were issued to me on March 13, 1951, January 20, 1959, and February 16, 1960, respectively.

The instant invention provides an improved means for completing a circuit through the battery and the bulb holding device set forth in the above application and patents.

It is, therefore, the principal object of the instant invention to provide an improved means for holding a battery and completing an electrical circuit through the battery and bulb within a fishing float.

Another object is to provide an electrical circuit means for lighting the bulb, in a fishing float of this class, separate from the battery holding means thereby permitting the use of a battery insulated from the holder.

Another object is to provide a fishing float which will be illuminated by a fish bite or strike on the line to which the device is secured.

A further object is to provide a fishing float or lure which may have the bulb or lamp continuously lighted or unlighted as may be desired.

Still another object is to provide battery and bulb holding means which may be inserted into any suitable housing or container feature a transparent or translucent end portion.

A further object is to provide a fishing float to which hooks may be connected to form a fishing lure.

An additional object is to provide a fishing lure containing battery and bulb holding means which is longitudinally adjustable within the housing for alternating the floating characteristics thereof, which adjustment permits the bulb to be continuously illuminated or intermittently lighted as may be desired.

Yet another object is to provide a fishing float which is of relatively light weight and, is, therefore, adaptable for use on most any type of fishing line.

The present invention accomplishes these and other objects by providing a tubate body having end closure cap means thus forming a float. At least one of the cap means is formed of transparent or translucent material. A substantially V-shaped, sleeve-like member is frictionally supported by the inner-wall of the body intermediate the ends of the latter. A battery holder or bracket is longitudinally received by the sleeve-like member and extends beyond both ends of the body and transversely between the inner-wall of the base portion of the sleeve-like member and an arc of the inner-wall of the body between the ends of the legs of the sleeve-like member. The battery holder partially envelops a dry cell battery and pivotally mounts a bulb carrier adjacent the terminal end of the battery. A light bulb carried by the bulb carrier swings into and out of circuit making contact with the battery terminal when the float is tilted longitudinally. Stops forming a part of the battery holder limit the pivoting action of the bulb carrier. A resilient wire clip carried by the battery holder frictionally engages the bulb carrier and acts as a stabilizing means to maintain the bulb in contact with the battery terminal against small amplitudes of movement of the bulb carrier. The end closure means of the float are provided with line connecting loops, or eyes, for connection to a fishing line.

Other objects will be apparent from the following description when taken in conjunction with the accompanying two sheets of drawings, wherein.

Like characters of reference designate like parts in those figures of the drawings in which they occur.

In the drawings.

Figure 1:
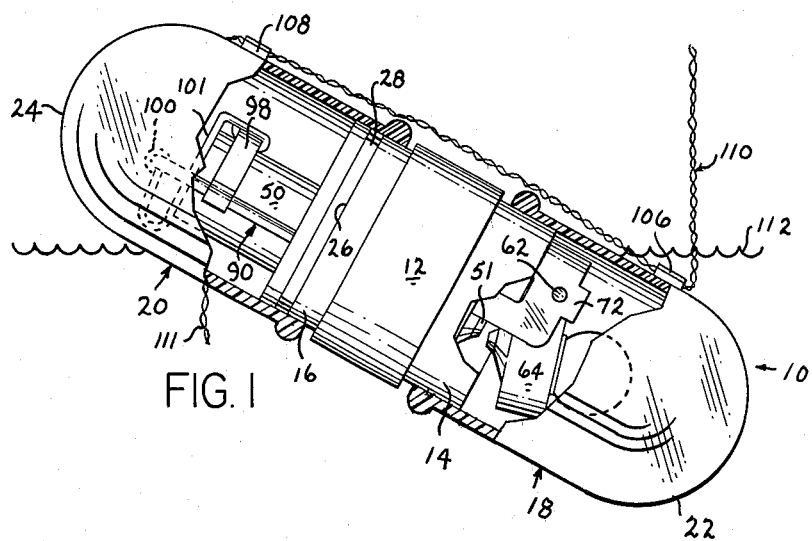
FIGURE 1 is an elevational side view of the device partly in section, illustrating the position the device assumes when fishing.

The reference numeral 10 indicates, as a whole, the device which is elongated and cylindrical-like in general configuration. The device 10 includes a central tubate body 12 preferably having circumferentially reduced end portions 14 and 16 adapted for receiving tubular caps or closure means 18 and 20, respectively. The caps 18 and 20 have semi-spherical closed ends 22 and 24, respectively, thus forming, with the body 12, a water tight compartment. As a means for insuring that the caps and the reduced end portions of the body form a water tight seal, the reduced end portions 14 and 16 may each be provided with an annular recess or groove for receiving suitable packing material such as a ring of rubber or the like. One such groove 26 and ring 28 is shown on the body end 16. The ring 28 is substantially rectangular in cross-section but may be circular if desired. At least one of the cap means, preferably the cap 18, is formed of transparent or translucent material for the purposes which will be readily apparent. The body 12 is preferably formed of suitable lightweight material and diametrically of a size which will readily receive the component parts more fully described hereinbelow, and when assembled with the caps 18 and 20, will displace a quantity of water exceeding the mass of the device. The bore of the body is circumferentially enlarged (FIG. 5), intermediate its ends to form a groove or recess 30. The length of the recess 30 is substantially slightly less than the length of the periphery of the body portion defined by the annular shoulders formed by the reduced end portions 14 and 16. The respective ends of the recess are defined by annular shoulders 32 and 34, respectively.

A substantially V-shaped sleeve-like member 36, having a wall thickness substantially equal to the depth of the recess 30 and having a length slightly less than the longitudinal spacing between the shoulders 32 and 34, is cooperatively received within the recess 30. The outer surface of the base end portion 38 of the sleeve-like member is in frictional engagement with the inner-wall of the body forming the recess while the free end edges of the diverging legs 40 contact a longitudinal portion of the body inner-wall and subtend an arc of the inner-wall of the body. The frictional contact between the sleeve-like member 36 and the inner-wall forming the recess 30 may be varied from a manually movable sliding contact position wherein the member 36 may be rotated relative to the body 12 or firmly positioned within the body. Such adjustment of the member 36 is accomplished by placing a clylindrical member or tool, not shown, within the sleeve adjacent its base end portion and then manually forcing or spreading the legs of the member 36 apart. Removal of the member 36 from the body 12 is accomplished by simply forcing the leg end portions 40 toward each other as by the use of long-nosed pliers, not shown, thus freeing the member 36 from contact with the inner-wall of the body 12.

Figure 6:
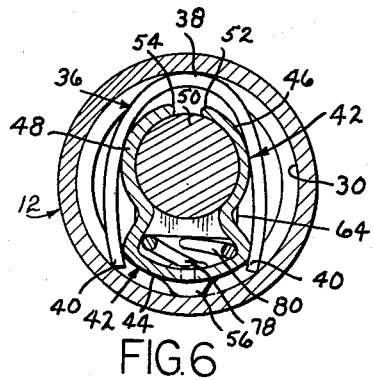

An elongated bracket or battery holder 42 has one longitudinal side 44 thereof arcuately formed on a radius complemental with respect to the radius of the bore of the body 12. The holder 42 further includes a pair of arcuately curved co-operating arms 46 and 48 which extend laterally of the side 44. The transverse distance across the battery holder from the arcuately curved side 44 to the free longitudinal edges of the arms 46 and 48 is substantially less than the diameter of the bore of the body 12 so that the bracket may be frictionally slid longitudinally into the body 12 within the confines of the sleeve-like member 36 therein. As may be seen from an examination of FIG. 6, the battery holder arms 46 and 48 extend from the arcuate side 44 inwardly toward the longitudinal axis of the body and are arcuately curved complementally, in a circular manner, for nesting a small dry cell battery 50. As shown in FIG. 6, the free longitudinal edges 52 and 54 of the battery holder arms are disposed in spaced-apart relation which permits adjustment of their relative position by increasing or decreasing the spacing therebetween for co-operatingly holding a battery, and, if desired, may form a frictional and circuit making contact between the arms and the battery 50. The arcuate outer surfaces of the arms 46 and 48 are frictionally received by the inner-surfaces of the legs of the V-shaped sleeve 36 which forces the arcuate surface 44 of the battery holder into frictional contact with an arc of the inner-wall of the body 12 between the position occupied by the free end edges of the sleeve legs 40. Intermediate its length the battery holder arcuate side 44 is provided with a lug 56 which extends outwardly a distance substantially equal to the depth of the recess 30. The sleeve 36 maintains a contact between the arcuate side 44 and the bore of the body at any selected position of the battery holder longitudinally of the body. The overall length of the battery holder is substantially equal to, or may be slightly greater than, the length of the body 12. The battery holder may be longitudinally positioned within the body, such movement being limited by the relative position of the lug 56 between the annular shoulders 32 and 34.

Figure 5:
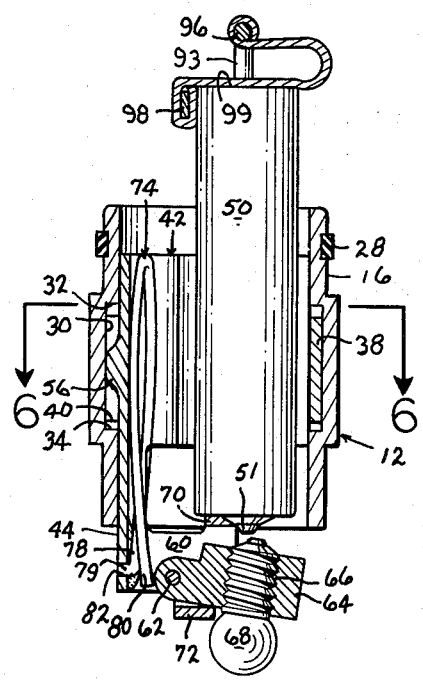
FIGURE 5 is a longitudinal cross-sectional view through the assembled device, partly in elevation, with the end caps removed; and, FIGURE 6 is a horizontal cross-sectional view, rotated substantially 90°, taken substantially along line 6—6 of FIG. 5.

One end, the depending end as seen in FIG. 5, of the battery holder 42, is provided with a pair of parallel side member 58 and 60 which extend laterally of the arcuate side 44 in spaced-apart relation beyond the adjacent end of the arms 46 and 48. A pin 62 extends transversely between the side members 58 and 60. A bulb carrier or socket 64 is pivotally mounted by the pin 62. The bulb carrier has a threaded socket 66 which cooperatingly receives a bulb 68. The socket positions the bulb in axial alignment with the battery 50. The base end of the bulb projects beyond the socket 64 a slight distance for making contact with the terminal end of the battery when the carrier 64 is pivoted toward the battery. A stop 70, formed on each of the side members 58 and 60, limits movement of the battery 50 toward the bulb carrier 64 and which similarly may limit the movement of the bulb carrier toward the battery. A second pair of stops 72 is formed on the side members 58 and 60, opposite the stops 70, and projects inwardly of the side members for limiting movement of the bulb carrier away from the battery. Thus the bulb carrier 64 is free to pivot through a relatively short distance between circuit making contact and circuit breaking contact with the battery. The circuit breaking movement being limited by the stops 72. When it is desired that the bulb 68 be continuously lighted, one of the stops 72 is bent toward the adjacent surface of the bulb carrier for continuously contacting the bulb carrier and holding the base end of the bulb 68 in contact with the battery terminal end 51. Similarly one of the stops 70 may be bent toward the bulb carrier 64 to limit movement of the latter toward the battery and prevent circuit making contact between the bulb and battery.

When the device is positioned, as shown in FIG. 1, gravitational attraction for the bulb carrier 64 maintains the bulb in circuit interrupted position. When the device is positioned horizontally or at an angle approaching a horizontal position, the pin 62 supports the bulb carrier. Slight movement of the device results in intermittent or poor contact between the bulb 68 and the battery 50, resulting in a flashing "on and off" of the light emitted by the bulb. To overcome this and to assure positive contact between the bulb and battery, stabilizing means 74 is positioned within the battery holder 42 adjacent the inward surface of the arcuate side 44. The stabilizing means 74 comprises a loop-like wire member 76 in frictional contact with the opposing inner-surfaces of the battery holder and having its end portions 78 and 80 disposed in crossed relation, as is shown more clearly in FIG. 4. The free end portion 79 of the portion 78 is turned at right-angle and is closely received by an aperture 82 in the battery holder side 44 adjacent the bulb carrier 64. The end portion 79 is preferably soldered within the aperture 82. The end portion of the other portion 80 resiliently contacts an adjacent arcuate edge of the bulb carrier 64. Thus the stabilizing means 74, positively anchored within the battery holder, resiliently bears against the bulb carrier 64 in a dampening or braking action of the pivoting movement of the latter. The frictional contact between the stabilizing means 74 and the bulb carrier 64 is sufficient to prevent small amplitudes of movement of the latter without hindering positive rotation of the bulb carrier about its pivot pin 62 in a circuit making or breaking action.

A substantially U-shaped rod-like member 90 is connected to the battery holder leg portions 46 and 48 adjacent their ends opposite the bulb carrier by pivotally turning the end portions of each of the legs 92 and 93 at right-angle, and inserting the latter within co-operating apertures 94 formed in the respective battery holder leg members. The bight portion 96 extends beyond the base end of the battery a selected distance. A first resilient strap-like member 98 is connected to and extends between the respective legs of the U-shaped member 90 in spaced relation with respect to its bight portion 96. Intermediate its ends the member 98 is off-set laterally of the plane defined by the legs 92 and 93 of the member 90, a distance substantially equal to the radius of the battery 50. A second strap-like spring member 100 is connected at one end with the bight portion 96 medially its ends and extends beyond the plane defined by the member 90 opposite the member 98 and is arcuately doubled back upon itself, as at 101, in spaced relation and extends between and beyond the plane of the legs of the U-shaped member where it is connected at its other end with the member 98 medially the ends of the latter. Thus, the doubled back portion of the spring member 100 resiliently contacts the base end 99 of the battery and maintains the terminal or opposite end thereof in contact with the stops 70 while completing a circuit from the base end of the battery through the member 100, U-shaped member 90, battery holder 42 and bulb carrier 64, when the bulb 68 is in circuit making contact with the battery terminal end 51. The U-shaped member 90 thus provides a complete circuit independent of the circuit making contact between the battery holder, arms 46 and 48, with the battery. This permits the use of a battery having an insulating jacket or cover. The member 98 forms a stop in contact with a peripherial portion of the battery and limits, or restricts, the movement of the U-shaped member to the position shown by dotted lines (FIG. 3) when engaging the base end of the battery.

Figure 3:
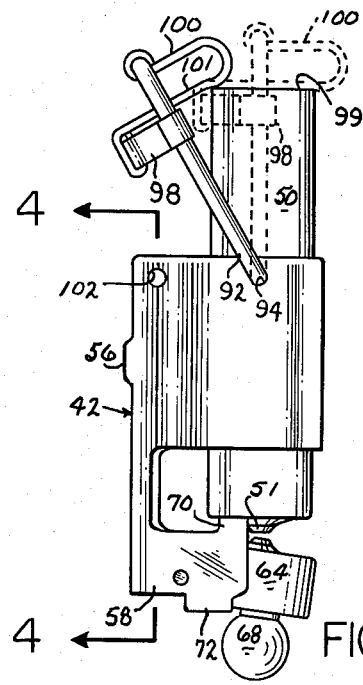
FIGURE 3 is an elevational view of the battery and bulb holder illustrating, by dotted lines, the position of the circuit completing means when in operative position.
Figure 4:
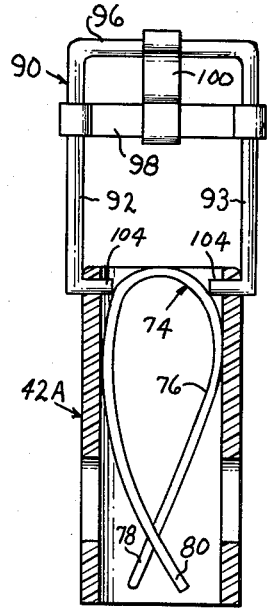
FIGURE 4 is a vertical cross-sectional view taken substantially along line 4—4 of FIG. 3, illustrating an alternate arrangement of the battery holder and circuit completing means.

It may be desirable to form the battery holder of other than metallic material, such as plastic. One such holder is illustrated in FIG. 4 and indicated by the numeral 42A. To complete a circuit in such an arrangement, apertures are formed on opposing sides of the battery holder adjacent the arcuate wall surface 44, as at 102 (FIG. 3). The inwardly projecting free ends 104, of the U-shaped member legs 92 and 93 are extended inwardly of the battery holder sides a distance sufficient to frictionally contact the stabilizing member 74. This will complete a circuit from the base end 99 of the battery through the U-shaped member 90, the stabilizer 74, bulb carrier 64 and the terminal end 51 of the battery when the base of the bulb is in contact with the latter.

Operation

Figure 2:
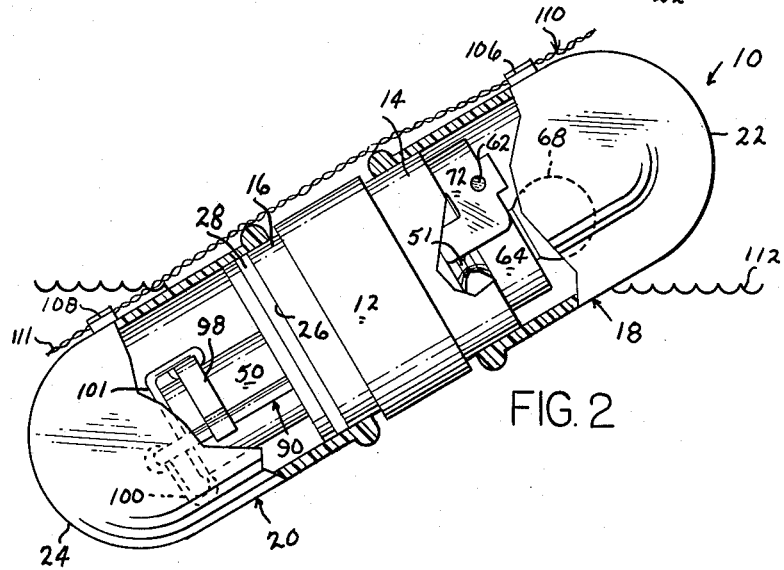
FIGURE 2 is a view similar to FIG. 1, illustrating the approximate position of the device tilted to an illuminating position by a strike.

In operation, the device is assembled substantially as disclosed hereinabove. The caps 18 and 20 are each exteriorly provided with line engaging loops or eyes 106 and 108 through which a fishing line 110 may be passed or to which the line may be secured. As viewed in FIG. 1, the left-hand vertical portion 111 of the line 110 leads to the fishhook and bait, not shown, while the right-hand vertical portion of the line 110 is connected with a fishing pole or reel, not shown. The mass of the battery holder 42 and socket 64 is longitudinally adjusted within the body 12 so that the device 10 floats in the water in substantially the position shown in FIG. 1. The upper surface of the water is indicated by the wavy line 112. Thus as shown in FIG. 1, gravitational attraction for the socket 64 maintains the latter in the position shown wherein the bulb is out of contact with the battery 50. The movement of the bulb carrier in this direction, is limited by the stops 72. When a fish strikes or takes the bait, the line portion 111 is pulled downwardly thus tilting or positioning the device to substantially the position shown by FIG. 2. In this position gravitational attraction for the bulb carrier 64 has swung the latter so that the bulb 68 makes electrical contact with the battery terminal end 51; thus lighting the lamp which is clearly visible through the cap 18.

The device may be used as a fishing float or lure without the use of its illuminating qualities, as for example, in daytime fishing by bending one of the stops 70 toward the bulb carrier 64 as disclosed hereinabove to maintain an interruption of the circuit making contact. Similarly the device may be used as a continuously illuminated night fishing float or lure by bending or adjusting one of the stops 72 for contacting the adjacent surfaces of the bulb carrier and maintaining a circuit through the bulb.

When adjusting the battery holder 42 relative to the body 12, or altering the floating characteristics of the device, the lug 56 contacts the respective shoulder 32 or 34 and serves as a warning that further movement of the battery holder relative to the body will disassemble the device.

Obviously the invention is susceptible to some change or alteration without defeating its practicability, and I therefore do not wish to be confined to the preferred embodiment shown in the drawings and described herein, further than I am limited by the scope of appended claims.

I claim:

1. An illuminating finishing float, comprising: a tubate body; tubular cap means having a bore adapted to be closely received by the respective ends of said body to form a water tight seal, each of said cap means having a semi-spherical closed end; a substantially V-shaped sleeve of resilient material frictionally carried by the inner-wall of the said body; a battery holder longitudinally disposed between the legs of said V-shaped sleeve and extending transversely between the base portion of said sleeve and the inner-wall of said body between the free ends of the legs of the sleeve; a battery within said battery holder; a substantially U-shaped member connected by the end portions of its legs to said battery holder and disposing the bight portion of said U-shaped member in parallel spaced relation with respect to the base end surface of said battery; a spring member interposed between the bight portion of said U-shaped member and the base end of said battery; a bulb carrier pilvotally mounted on said battery holder adjacent the terminal end of said battery; stops integrally carried by one end of said battery holder and engageable with opposing surfaces of said bulb carrier for limiting the pivoting movement of the latter and limiting the movement of said battery toward said bulb carrier; and a light bulb supported by said bulb carrier in a manner to gravitationally swing into and out of circuit making contact with the terminal end of said battery when the float is tilted longitudinally.

2. Structure as specified in claim 1, and bulb carrier stabilizer means secured to said battery holder in contact with said bulb carrier for stabilizing the latter when said bulb is in circuit making contact with the battery terminal, said stabilizer means comprising a wire-like member of resilient material doubled back upon itself to form a loop frictionally engaged with opposing inward surfaces of said battery holder, said wire-like member having one end connected to said battery holder adjacent said bulb carrier and having its other end portion frictionally contacting said bulb carrier.

3. An illuminating fishing float, comprising: a tubate body; tubular cap means having a bore adapted to be closely received by the respective ends of said body to form a water tight seal, each of said cap means having a semi-spherical closed end; a substantially V-shaped sleeve of resilient material frictionally carried by the inner-wall of said body; a battery holder longitudinally disposed between the legs of said V-shaped sleeve and extending transversely between the base portion of said sleeve and the inner-wall of said body between the free ends of the legs of the sleeve; a battery within said battery holder; a substantially U-shaped member pivotally connected by the end portions of its legs to opposing sides of said battery holder, the bight portion of said U-shaped member projecting beyond the base end of said battery when the U-shaped member is longitudinally aligned therewith; spring means connected with said U-shaped member and releasably engageable frictionally with the base end of said battery; a bulb carrier pivotally mounted on the end of said battery holder opposite the U-shaped member; at least one stop integrally carried by the last mentioned end of said battery holder and interposed between said bulb carrier and the terminal end of said battery for limiting the movement of said bulb carrier and limiting movement of said battery toward said bulb carrier; a light bulb supported by said bulb carrier in a manner to gravitationally swing into and out of circuit making contact with the terminal end of said battery when the float is tilted longitudinally; and bulb carrier stabilizing means frictionally carried by said battery holder for frictional engagement with said bulb carrier and stabilizing the latter when the bulb is in circuit making contact with the battery terminal.

4. An illuminating fishing float, comprising: a tubate body; tubular cap means having a bore adapted to be closely received by the respective ends of said body to form a water tight seal, each of said cap means having a semi-spherical closed end; a substantially V-shaped sleeve of resilient material frictionally carried by the inner-wall of said body; a battery holder longitudinally disposed between the legs of said V-shaped sleeve and extending transversely between the base portion of said sleeve and the inner-wall of said body between the free ends of the legs of the sleeve; a battery within said battery holder; a U-shaped member pivotally connected by the end portions of the legs thereof to opposing sides of one end of the battery holder, said leg portions projecting inwardly of the inner-wall surface of said battery holder, the bight portion of said U-shaped member extending beyond the base end of said battery; spring means connected with said U-shaped member and releasably engaged frictionally by the base end of said battery; a bulb carrier pivotally mounted on the end of said battery holder opposite the U-shaped member and adjacent the terminal end of said battery; stops formed on said battery holder and engageable with opposing surfaces of said bulb carrier and the adjacent end of said battery for limiting the movement of said bulb carrier toward and away from said battery and limiting movement of said battery toward said bulb carrier; a light bulb supported by said bulb carrier in a manner to gravitationally swing into and out of circuit making contact with the terminal end of said battery when the float is tilted longitudinally; and a resilient wire member frictionally carried by said battery holder in contact with the end portions of the legs of said U-shaped member and said bulb carrier for completing a circuit through said bulb and the battery when said bulb is in contact with the battery terminal end.

5. An illuminating fishing float, comprising: a hollow open ended body; end closure caps removably carried by said body; a substantially V-shaped sleeve of resilient material frictionally carried by the inner-wall of said body; a battery holder frictionally carried between the legs of said V-shaped sleeve; a battery within said battery holder; a U-shaped member pivotally connected by the end portions of its legs to one end portion of said battery holder; spring means extending between the legs of said U-shaped member and connected to the bight portion thereof for frictional engagement with the base end of said battery; stops formed on said battery holder opposite said U-shaped member and engageable with said battery for limiting movement of the latter; a bulb carrier pivotally mounted on said battery holder adjacent said stops; and a bulb mounted in said bulb carrier for engagement with the terminal end of said battery to light the bulb when said bulb carrier is pivoted toward said battery.

6. An electrical assembly for illuminating a fishing float, comprising: a battery holder having a pair of laterally projecting co-operatively curved arms; a battery longitudinally positioned between said arms; a U-shaped member pivotally connected by the end portions of its legs to one end portion of said battery holder; spring means extending between and connected with the legs of said U-shaped member and the bight portion thereof, said spring member frictionally engageable with the base end of said battery; stops formed on the end portion of said battery holder opposite said U-shaped member; a bulb carrier pivotally mounted on said battery holder adjacent said stops and movable toward and away from the adjacent end of said battery; and a light bulb supported by said bulb carrier.

7. Structure as specified in claim 6 and bulb stabilizing means carried by said battery holder in contact with said bulb carrier, said stabilizing means comprising a wire-like member of resilient material frictionally engaged with opposing inward surfaces of said battery holder, said wire-like member having one end connected to said battery holder adjacent said bulb carrier and having its other end portion frictionally contacting said bulb carrier.

References Cited in the file of this patent

UNITED STATES PATENTS

| | | |
|---|---|---|
| 2,530,050 | Evans | Nov. 14, 1950 |
| 2,920,318 | Blacken et al. | Jan. 5, 1960 |
| 2,933,844 | Seigle | Apr. 26, 1960 |